United States Patent [19]
Davis

[11] Patent Number: 5,468,113
[45] Date of Patent: Nov. 21, 1995

[54] ONE-PIECE FOLDING AUGER FOR BULK MATERIAL TENDER

[75] Inventor: Harold A. Davis, Willmar, Minn.

[73] Assignee: Willknight, Inc., Wayzata, Minn.

[21] Appl. No.: 104,370

[22] Filed: Aug. 9, 1993

[51] Int. Cl.$^6$ .............................. B65G 33/14; B60P 1/40
[52] U.S. Cl. ...................... 414/523; 414/526; 414/505; 414/326; 198/550.1; 198/668
[58] Field of Search .................................. 414/519, 523, 414/526, 326, 503, 504, 505; 198/550.1, 668, 632, 315, 317

[56] References Cited

U.S. PATENT DOCUMENTS

| | | | |
|---|---|---|---|
| 2,417,020 | 3/1947 | Shugart | 414/505 |
| 2,481,860 | 9/1949 | Miller | 414/523 X |
| 2,877,914 | 3/1959 | Herr | 214/522 |
| 3,171,558 | 3/1965 | Sharp | 414/505 |
| 3,326,397 | 6/1967 | Lippmann et al. | 214/83.26 |
| 3,584,732 | 6/1971 | Tyler et al. | 198/632 |
| 3,770,101 | 11/1973 | Carlson | 198/115 |
| 4,093,087 | 6/1978 | DeCoene | 214/83.26 |
| 4,218,169 | 8/1980 | Arends | 414/523 |
| 4,422,767 | 12/1983 | Yelton | 414/505 X |
| 4,613,275 | 9/1986 | Karlowsky | 414/489 |
| 4,742,938 | 5/1988 | Niewold | 222/381 |
| 4,846,621 | 7/1989 | Warsaw | 198/668 X |
| 5,013,208 | 5/1991 | Grieshop | 414/526 |
| 5,100,281 | 3/1992 | Grieshop | 414/526 |

FOREIGN PATENT DOCUMENTS 917755  4/1982  U.S.S.R. .................. 414/503

OTHER PUBLICATIONS

"Charger II, Charger II–C and Charger II–SF the most versatile dry bulk tender on the market today"; flyer, 2 pp., publication believed to predate filing by at least 1 yr. by Ray–Man, Inc., 515 Broadway, Keota, Iowa 52248.

"Barber Engineering Nurse Box", flyer, 2 pp., publication believed to predate filing by at least 1 yr, by Barber Agri Sales, Spokane, Wash. & Filer, Id.

Primary Examiner—Robert J. Oberleitner
Assistant Examiner—Stephen Gordon
Attorney, Agent, or Firm—Fitch, Even, Tabin & Flannery

[57] ABSTRACT

A one-piece folding auger system for use with a bulk material tender using an elongated auger having its end mounted to a first device by a first pivotal mount that allows the auger to rotate forward and backward by way of a hydraulic cylinder. The first device is then mounted for rotation at the rear of a vehicle with a second pivotal mount that allows the auger to rotate vertically by way of a second hydraulic cylinder. The multi-axis pivoting includes the first pivotal mount cooperatively, and at times simultaneously, pivoting both with the second pivotal mount and about its axis of rotation to pivot the auger between its stowed position in which the auger extends substantially parallel and adjacent to the vehicle and its discharge position in which the auger extends upwardly and laterally away from the vehicle for a side discharge of bulk material within a hopper on the vehicle. When in the discharge position the auger's inlet communicates with the receptacles at the bottom end of the truck or trailer with a dust-tight connection.

20 Claims, 10 Drawing Sheets

ONE-PIECE FOLDING AUGER FOR BULK MATERIAL TENDER

BACKGROUND OF THE INVENTION

1. Field of the Invention

The present invention relates to bulk material tenders, such as trucks or trailers, that receive and discharge grain and the like and, more particularly, to a tender which discharges material from its side with a one-piece folding auger that moves between a first, discharging position and a second, stowed position.

2. Description of the Related Art

It is known to provide bulk material tenders with pivotally mounted unloading tubes which, for transport purposes, are positioned alongside the tender, but for unloading purposes can be pivoted to positions generally traverse to the tender for unloading the tender from the side. For these purposes, it is of particular importance to efficiently and effectively position the discharge tube for unloading, while providing suitable communication for the material between the tender and the discharge tube. It is also important to provide for lateral movement of the discharge tube. Bulk material tenders of the type described herein typically transport on the order of 16 to 24 tons of dry material which may be discharged through a system of augers at rates up to approximately 4,000 lbs. per minute unloading capacity. Thus, once positioned properly for discharge, such tenders may typically be unloaded in 8 to 12 minutes. Much time is expended preparing the tender and particularly the configuration of discharge augers to prepare the tender for unloading. Prior art approaches have utilized articulated auger tubes and discharge auger tubes having multiple sections which are disassembled for stowing and must be reassembled for discharge. Such operations may be time consuming, especially relative to the fairly short amount of time required to unload the bulk material once the tender is set up for discharge.

Additionally, most prior art bulk material tenders provide discharge tubes which move in all three axes in preparation for unloading of the material. It should be appreciated that free movement in all three axes is unnecessary and perhaps adds to the time required for setup.

The following exemplify prior art approaches. U.S. Pat. No. 2,877,914 to Herr discloses a bulk loading conveyor pivotally mounted at the rear of a truck for movement both in the azimuth and vertical directions. In operation, the conveyor pivots about three axes of rotation and a bale provides an axis about which a boom may be rotated angularly to raise or lower its outer end. A trunnion permits the boom to swivel in the azimuth. U.S. Pat. No. 3,326,397 to Litman et al. discloses an apparatus in which a crane boom, a trolley, a chain having a turn buckle, a roller block and a lifting bale cooperate to move a discharge belt conveyor between an operating position and a stowed position. The turn buckle thus raises the conveyor for enabling the boom to pivot about its axis, to swing the conveyor while the conveyor rotates through its pivotal mount with lifting bale and sides outward along the boom through the trolley, in order to be moved from its stored position to its operative position. U.S. Pat. No. 3,770,101 to Carlson discloses an articulated unloading boom hinged to one end of a transport storage body for movement between a retracted travel position, wherein the boom is unfolded against one side of the body, and an erect service position, wherein the hinged boom sections are aligned. The boom comprises an upper section and a lower section pivotally joined by a hinge. A hydraulic actuator rotates the upper section between its folded, travel position and its aligned, service position relative to the lower section. U.S. Pat. No. 4,093,087 to DeCoene discloses a system for moving an unloading tube having a main portion and an end portion angled with respect to the main portion between an inoperative, transport position and a selected unloading position. The angled end portion is thus pivotally mounted on a lower inclined portion of a side wall so as to extend upwardly and outwardly away from the central, vertical fore and aft plane of a vehicle. DeCoene thus uses a segmented auger wherein segments are disposed at a predetermined angle to one another and consequently the auger is able to pivot about a single axis located perpendicular to the inclined mounting surface of the side wall for moving between the desired position. U.S. Pat. No. 4,613,275 to Karlowski discloses an auger support arrangement for attachment to a side wall of a truck box, which enables the auger to be moved from a storage position alongside the side wall to an operating position parallel to the tailgate of the truck. An auger conveyor is supported upon a swingable material conveyor support which includes a pivot arm swingable in an arc about a first hinge joint and a clamp for centrally attaching the arm to the auger conveyor. The clamp includes a second hinge joint and third hinge joint for enabling the auger conveyor to pivot about multiple axes when moving between its stored and operating positions. The auger system is attached substantially at its center and moved therefrom by an arm attached to the side wall of the truck box. U.S. Pat. No. 4,742,938 to Niewold discloses a positioning mechanism for an auger in which the auger is hydraulically swung between its transport and working positions. The auger tube is mounted at its lower end by a swivel to a wall of a hopper, permitting the auger tube to swing into place via a hydraulic cylinder.

Since multiply segmented, articulated and swivelably mounted auger systems often are difficult and time consuming to set up and are easily fouled, it is desirable to provide an auger conveyor system for a discharge tube which is easily set up, moves only in defined planes and provide effective, dust-free communication of the bulk material from the tender to the discharge tube. Accordingly, it would be desirable to provide discharge tube movement about one axis from its stowed position to its operating position, wherein dust-free communication of material is provided from the tender to the discharge auger. Then, it is further desirable to provide limited lateral discharge tube movement in a single vertical plane alongside the tender, allowing the discharge tube to move upwardly and downwardly within a predetermined range for unloading purposes. By limiting the movement of the discharge tube to provide for only necessary movements, it is thus possible to provide timely and effective setup for discharge of the bulk material tender.

SUMMARY OF THE INVENTION

The present invention provides a one-piece folding auger for a bulk material tender which avoids the disadvantages of the prior art. In accordance with the present invention, one end of a discharge auger is mounted with a first pivotable mount to a first device that, in turn, is mounted to the rear of a hopper frame on a vehicle with a second mount, wherein the first pivotable mount cooperatively, and at times simultaneously, pivots both with the second pivotable mount and about its axis of rotation, to move the auger. The first pivotable mount allows the auger to rotate forward and backward and the second pivotable mount allows the auger to rotate up and down. Thus, the pivotal movement of the first pivotable mount moves about the arc swept by the swing of the second pivotable mount. The first pivotable mount allows pivoting about the second pivotable mount, to pivot the discharge auger between its stowed position, in which the auger extends substantially parallel and adjacent to the vehicle, and its discharge position, in which the auger in a plane traverse to the vehicle extends upward and laterally away from the vehicle. When in its discharge position, the discharge auger has a dust-tight connection at its inlet which communicates with the receptacle at the bottom rear of the vehicle through a spring loaded plate.

It is thus an object of the present invention to provide a one-piece folding auger for side discharge of a bulk material tender.

Another object of the present invention is to provide a one-piece folding auger which folds between a discharge position and a stowed position, thereby allowing a legal width for transport over public roads.

A further object of the present invention is to provide quick and easy setup of the one-piece folding auger while providing dust-free communication of bulk material from the tender to the discharge tube.

These and other objects according to the present invention which will become apparent from studying the appended description and drawings are provided in a portable, self-unloading particulate matter tender suitable for mounting on a vehicle for ground travel including a longitudinal extending frame having a first and second end. The tender has a container supported by the frame including a chamber having a generally rectangular configuration formed by the side walls connecting the end walls, the side walls having converging and sloping lower portions to provide the chamber with a lower particulate matter collecting portion. The collecting portion has at least one discharge opening and a first means for moving the particulate matter from the at least one discharge opening to one of the first and second ends of the frame.

A pivotable discharge mounting system for selectively communicating with the first means for pivoting to discharge the particulate matter to a predetermined deposit location is located lateral to the container. The discharge system includes an elongated member having a continuous outer wall, an intake end selectively communicatable with the first means for moving to receive the particulate matter and being pivotally mounted adjacent one of the first and second ends of the frame for multi-axis pivoting of the member and a discharge end located opposite the intake end for discharging the particulate matter from the member. A spring-loaded face plate near the end of the elongated member facilitates substantially dust-free communication of the particulate matter, and an oblong opening in the lower particulate matter collecting portion facilitates such communication while the elongated member undergoes lateral movements.

A first pivotal mount for pivotally mounting the intake end enables the member to pivot about a first axis, and a second pivotal mount for pivotally mounting the intake end enables the member to pivot about a second axis, the second pivotal mount being pivotable by and about the first pivotal mount, the first and second pivotal mounts cooperating to pivot the member between a stowed position in which the member extends substantially parallel and adjacent to one of the first and second side walls to a discharging position in which the member extends to locate the discharge and upward and lateral with respect to the container and to connect the intake end to the first means for moving. A second means is used for mechanically moving the particulate matter through the member from the intake end to the discharge end. Mechanical means for selectively pivoting the elongated member through the first and second pivotal mounts between the stowed position and the discharge position are employed.

Additional objects and advantages of the one-piece folding auger will be set forth in part in the description which follows, and in part will be obvious from practice of the invention. The objects and advantages of the invention will be realized and attained by means of the elements and combinations particularly pointed out in the appended claims. It is to be understood that both the foregoing general description and the following detailed description are exemplary only and are not restrictive of the invention as claimed. The accompanying drawings which are incorporated in and constitute a part of this specification illustrate one embodiment of the invention and, together with the description, serve to explain the principles of the invention.

DETAILED DESCRIPTION OF THE
PREFERRED EMBODIMENT

Reference will now be made in detail to the present preferred embodiment of the invention, examples of which are illustrated in the accompanying drawings.

Figure 1:
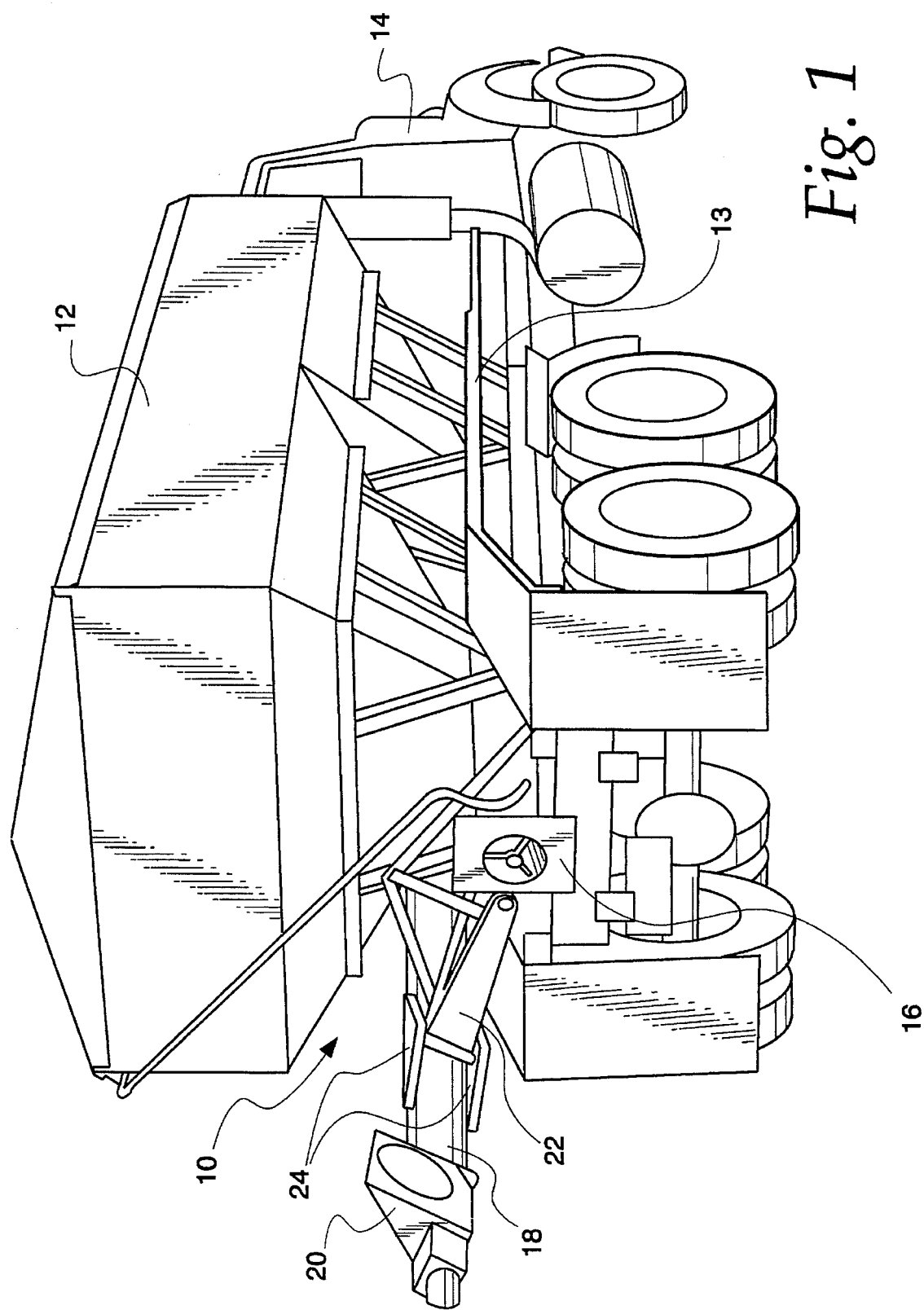
FIG. 1 is a perspective view of a bulk material tender incorporating a one-piece folding auger in accordance with the present invention.

As depicted in FIG. 1, a bulk material handling vehicle, used to transport a wide variety of bulk materials such as grain, feed pellets, fertilizer and the like from location to location and for unloading of such materials into storage, is shown as a side auger tender 10. The side auger tender 10, a conventional vehicle of this type, has a bulk material storage body with a discharge opening at one end. Herein depicted, a hopper assembly 12 is supported upon a hopper support frame 13, all of which rests upon the rear portion of a truck 14. The hopper assembly 12 and hopper support frame 13 as well as most key parts associated with the side auger tender 10 embodiment described herein are made out of stainless steel.

Bulk material stored in the hopper 12 is discharged through a rear auger tube 16 from a cross-auger assembly which runs along the bottom of the hopper 12. The material is thus discharged through a discharge auger housing 18 which receives such material in a discharge box 20.

A discharge auger hinge 22 is pivotally mounted to the hopper support frame 13 at one end and pivotally mounts the discharge auger housing 18 via discharge auger housing supports 24. As should be appreciated, the pivotable mounts at each end of the discharge auger hinge 22 facilitate movement of the discharge box 20 towards the rear auger tube 16, allowing their interface and effective communication of the bulk material from the hopper 12 with the cross-auger through the rear auger tube 16 into the discharge box 20 and through the discharge auger housing 18.

Figure 2:
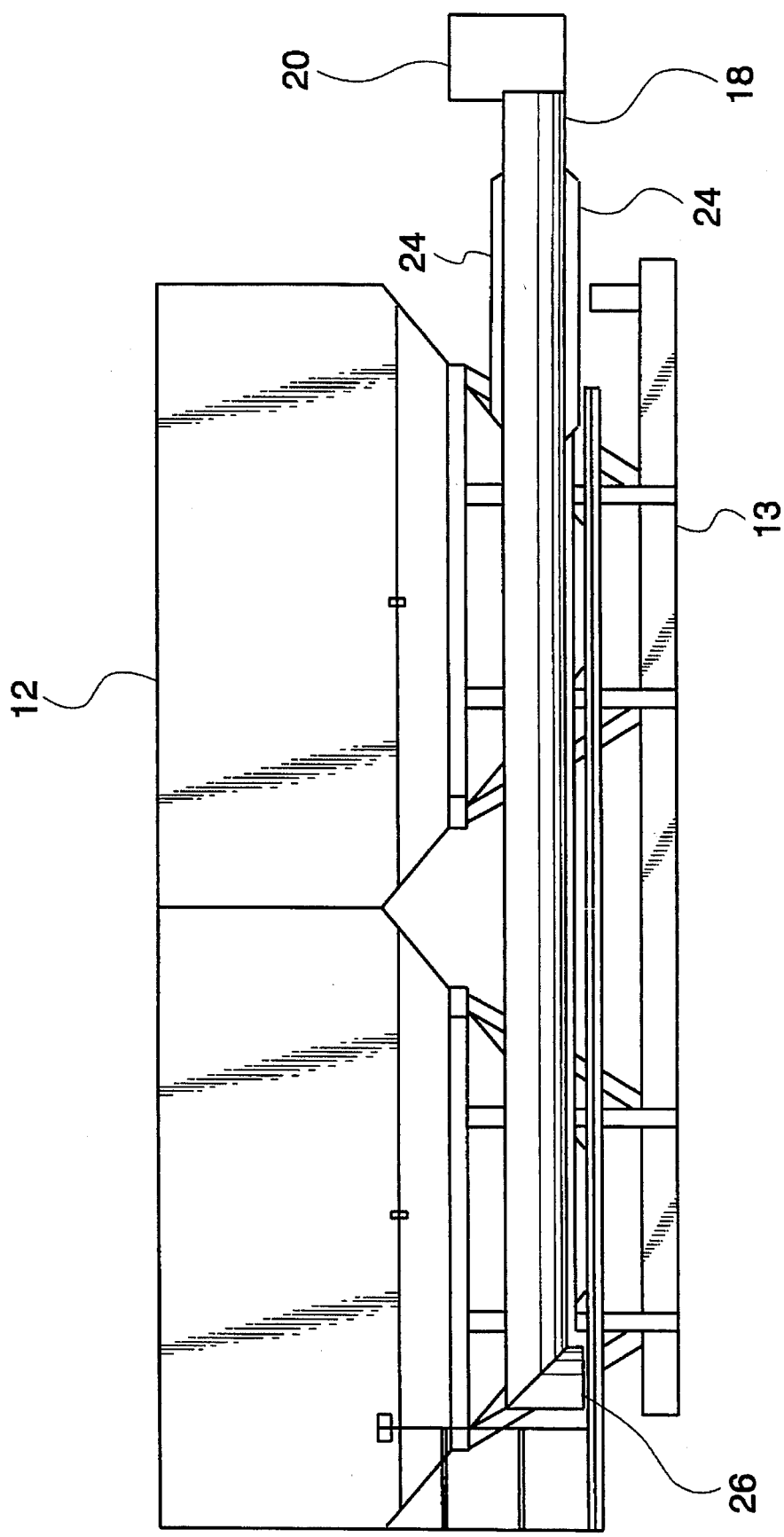
FIG. 2 is an elevated side view of the hopper assembly and frame support and the discharge auger housing in its stowed position.

FIG. 2 depicts an elevated side view showing only the hopper assembly 12, hopper support frame 13, discharge auger housing 18 and parts associated therewith. As shown, the discharge auger housing 18 is stored along side the hopper assembly 12 on the hopper support frame 13. The discharge auger housing is essentially an unitary construction, with the discharge box 20 at one end and a discharge chute 26 at the opposite end. As illustrated, the discharge auger housing 18 and discharge box 20 may extend 4 to 6 feet away from the rear end of the hopper assembly 12 and hopper support frame 13. Thus, when mounted on the truck 14 it is desirable, for safety purposes, to place reflectors or lights on the end of the discharge box 20 because it will stick out while the truck 14 is driven.

Figure 3:
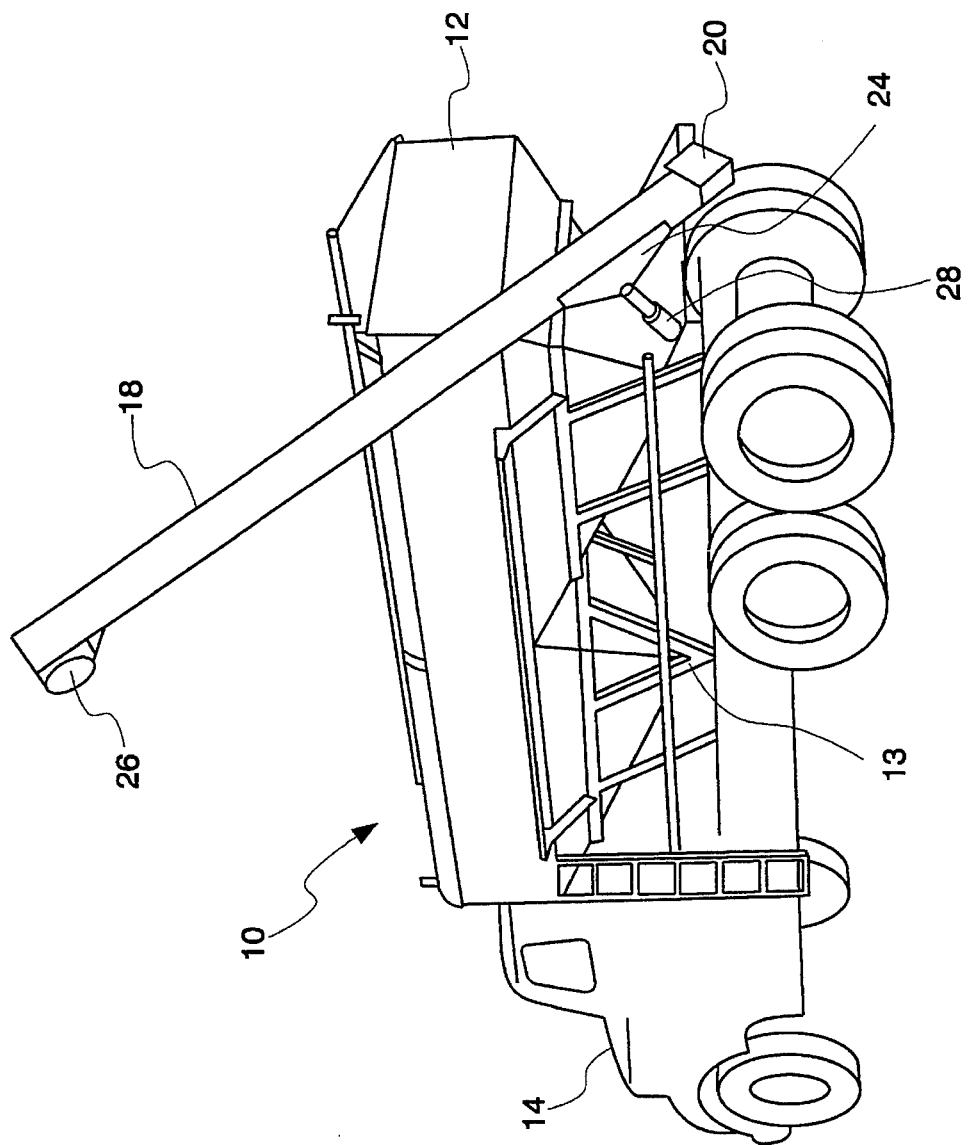
FIG. 3 is a perspective view of the bulk material tender with the discharge auger housing in its elevated erect discharge position.
Figure 4A:
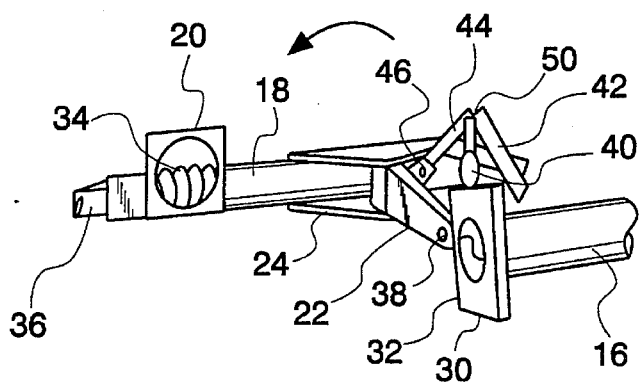
FIGS. 4A, 4B, 4C and 4D illustrate movement of the auger housing and particularly the discharge box into communication with the rear auger tube.
Figure 4B:
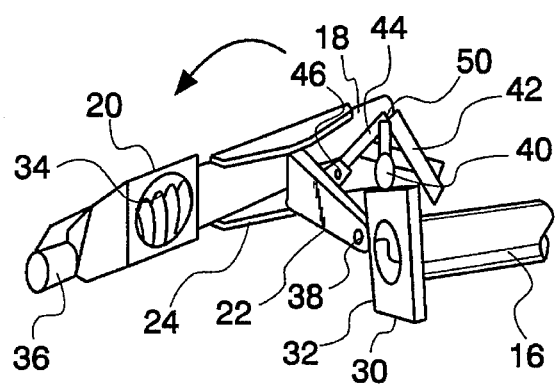
Figure 4C:
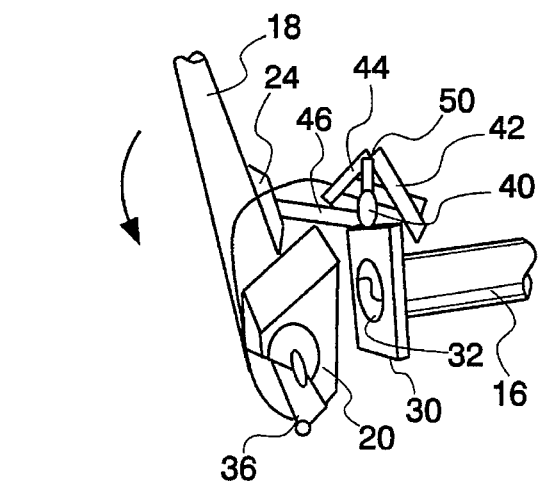
Figure 4D:
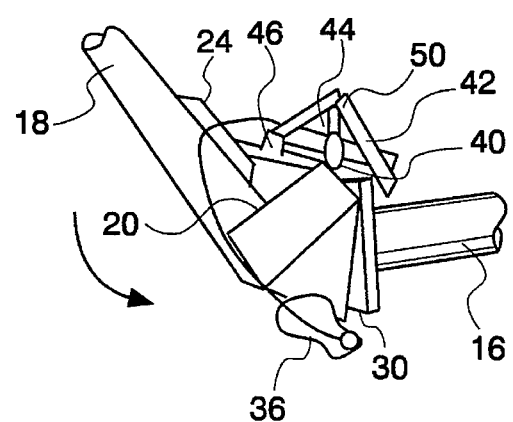

In FIG. 3, the discharge auger housing 18 and discharge chute 26 are shown in an upward, extended position for side discharge of the bulk material within the hopper 12. A swing cylinder 28 provides hydraulic means for moving the discharge auger housing 18 outward and away from its stowed position along side the hopper support frame 13. The movement of the discharge auger housing outward and away from its stowed position is illustrated in FIGS. 4A, 4B, 4C and 4D. The discharge auger housing 18 mounted on the discharge auger housing supports 24 pivots around the end of the discharge auger hinge 22, as illustrated by the arrows in FIGS. 4A, 4B, 4C and 4D. Pivot hole 38 additionally allows the discharge auger housing 18 to be raised and lowered around the axis of pivot hole 38. The raising and lowering motion and the swinging out motion may be effectuated simultaneously and are independent of one another during discharge setup, thus shortening the time associated with setting up the side auger tender 10 for discharge.

FIGS. 4A, 4B, 4C and 4D further illustrate the way in which the rear auger tube 16 communicates with an oblong inlet hole 34 on the discharge box 20 via a discharge sealing plate 30 having a rear discharge hole 32. The discharge sealing plate 30 is spring loaded, allowing for dust-free communication of material through the rear auger tube 16 into the discharge box 20. The oblong inlet hole in the discharge box 20 facilitates communication of the material as the discharge auger housing 18 is raised and lowered via the discharge auger hinge 22.

All movement of the discharge housing 18 and associated parts is done with hydraulics, though other movement means would suffice. Raise-and-lower cylinder 40 provides hydraulic means for raising and lowering the discharge auger hinge 22 and thus the discharge auger housing 18. A cylinder link 42 is connected to the hopper support frame 13 and the raise-and-lower cylinder 40 via linkage point 50. A discharge auger hinge linkage 44, connected at discharge auger hinge linkage connection tabs 46 on the discharge auger hinge 22, is connected at its opposite end to the raise-and-lower cylinder 40 at linkage point 50. Thus, the raise-and-lower cylinder 40 hydraulically raises and lowers the discharge auger housing 18. A hydraulic discharge auger motor is used to power the assembly.

Figure 5:
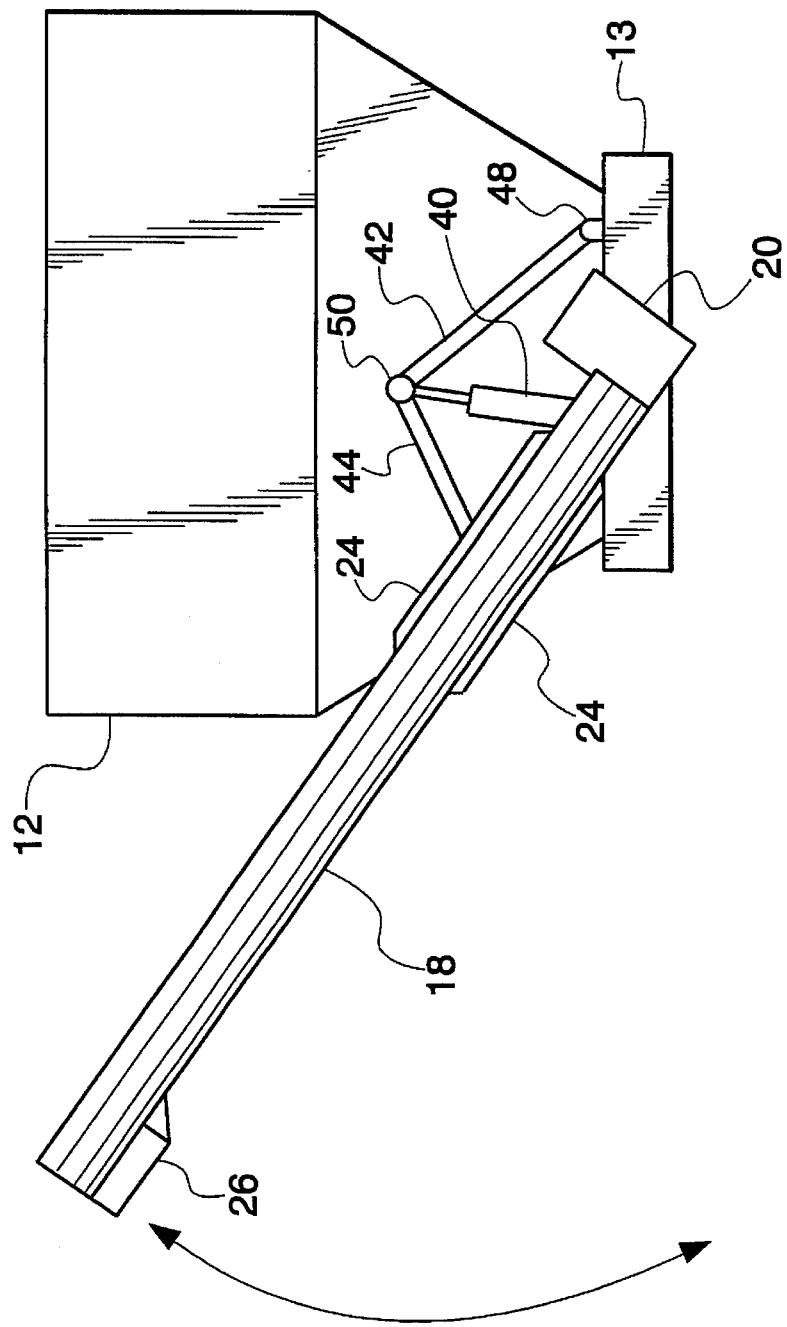
FIG. 5 is an elevated rear view of the hopper and discharge auger illustrating vertical movement in a single plane for discharge.

FIG. 5 further illustrates the raise-and-lower cylinder 40 and associated linkages, further illustrating cylinder linkage 42 connected at the hopper support frame 13 via cylinder link connection tabs 48. FIG. 5 also illustrates vertical movement of the discharge auger housing 18. In the present embodiment, the adjustable movement of the discharge auger housing 18 extends a range of 124 inches upwardly and 79 inches downwardly.

Figure 6:
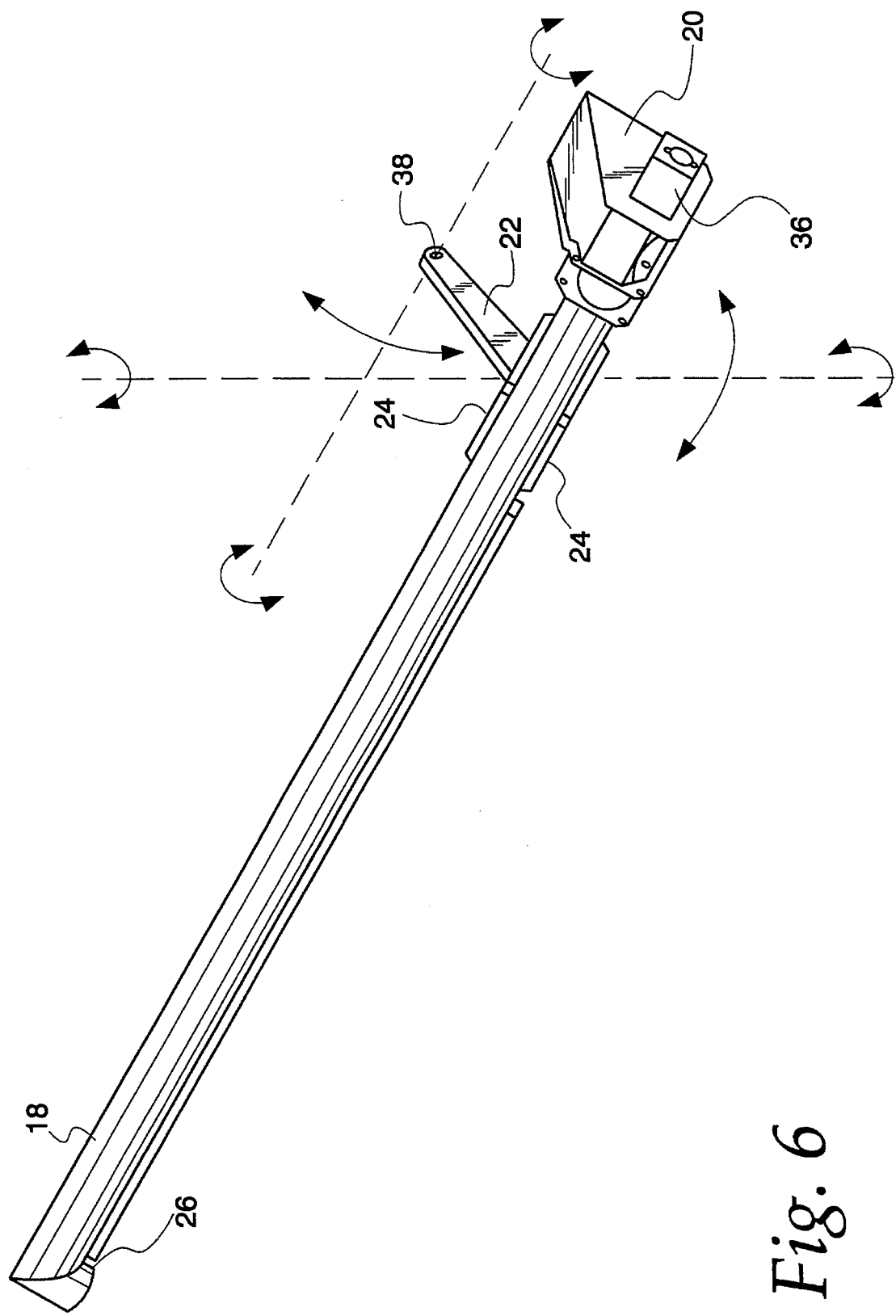
FIG. 6 shows the discharge auger housing pivotally mounted on the discharge auger hinge, allowing pivotal movement of the housing about the arc created as the hinge sweeps about its axis.

FIG. 6 illustrates the two axes of multi-axis movement of the discharge auger housing 18. In particular, it should be appreciated that the discharge auger hinge 22, supported at the pivot hole 38, sweeps an arc and the discharge auger housing 18, supported at discharge auger housing supports 24, rotates in an axis about the arc swept by the discharge auger hinge 22. As already indicated, the movement in these two axes may occur simultaneously for efficient and expeditious deployment of the apparatus. It should be appreciated that the movement shown in FIG. 6, although limited, is in fact advantageous and further degrees of movement are unnecessary and impede deployment of such apparatus.

Figure 7:
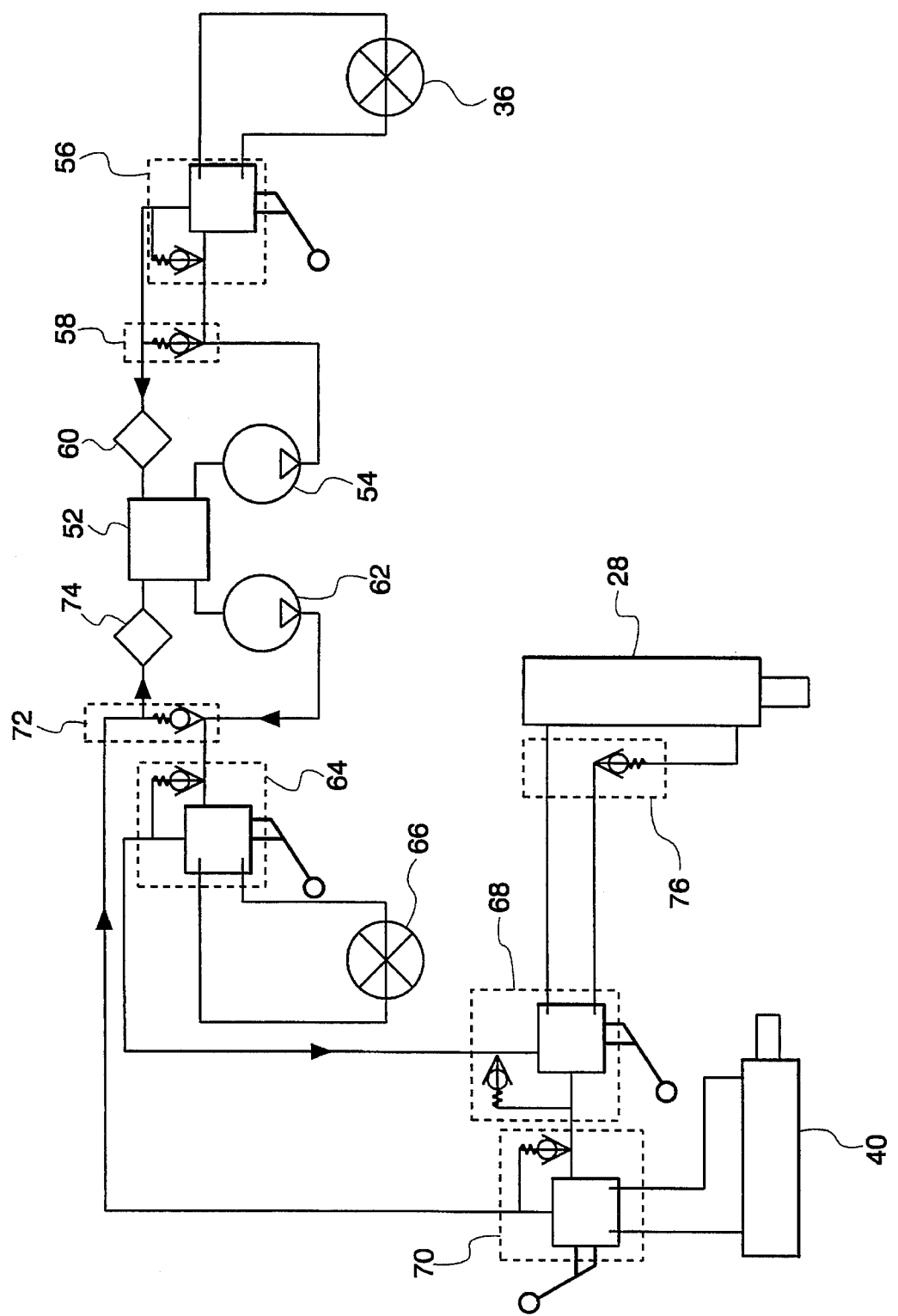
FIG. 7 is a schematic drawing of the hydraulic system used for facilitating movement of the discharge auger housing in accordance with the present invention.

FIG. 7 schematically illustrates the hydraulic system associated with the embodiment. The hydraulic reservoir capacity is approximately 25 gallons, or 94.6 liters. An oil tank 52 holds the oil used by the system. In a first hydraulic circuit, a first pump 54 pumps oil to a discharge auger on/off control valve 56 having a 2500 psi relief valve which delivers oil to the hydraulic discharge auger motor 36. A 2500 psi relief valve 58 shunts oil away from the hydraulic discharge auger motor 36 as necessary. The oil returns to the oil tank 52 via a first filter 60. The hydraulic discharge auger motor 36 operates at 500 rpms and during operation will facilitate the discharge of the following materials at the following rates: Urea=2700 lbs. per minute, or 48 lbs. per cubic foot; DAP=3400 lbs. per minute, or 59 lbs. per cubic foot; Potash=4000 lbs. per minute, or 70 lbs. per cubic foot.

In a second hydraulic circuit, a second pump 62 pumps oil to a cross-auger on/off control valve 64 having a 2500 psi relief valve, thus powering a cross-auger motor 66. Next, a swing cylinder control valve 68 having a 1000 psi relief valve drives the swing cylinder 28 and a swing cylinder relief valve 76 shunts oil as necessary. Then, the circuit powers the raise-and-lower cylinder 40 via a raise-and-lower control valve 70 having a 1000 psi relief valve. Oil returns via a second filter 74 and a 2500 psi relief valve 72 shunts oil, as necessary, within this second hydraulic circuit.

Figure 8:
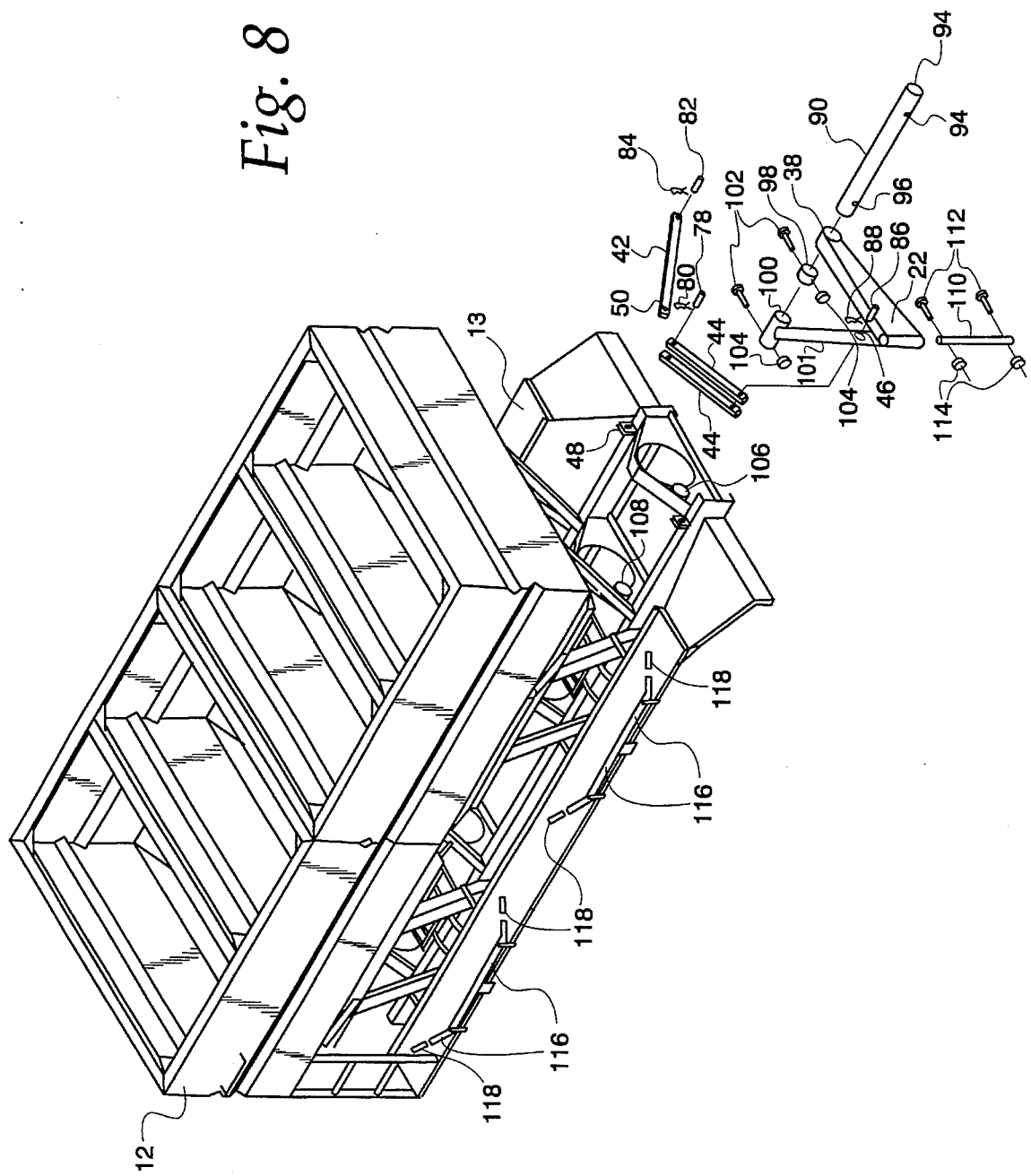
FIG. 8 is a perspective view of the discharge auger hinge, hydraulic linkage, hopper assembly and frame support.

FIG. 8 illustrates the hopper assembly 12 and hopper support frame 13, further illustrating hydraulic linkages and other parts associated with the discharge auger hinge 22 as well as support for the discharge auger housing 18. A clevis pin 78 and a hair pin 80 are used to connect the cylinder linkage 42 and discharge auger hinge linkage 44 at linkage point 50. A clevis pin 82 and hair pin 84 connect the cylinder linkage 42 to the cylinder link connection tabs 48 of the frame support 13. A clevis pin 86 and hair pin 88 connect the discharge auger hinge linkage 44 at the discharge auger hinge linkage connection 46 on the discharge auger hinge 22. The discharge auger hinge 22 is pivotally connected to the frame with a hinge pipe 90 having a flared end 92 and hinge pipe screw holes 94 and 96. Tubing sleeves 98 and 100 slide onto the hinge pipe 90 and are connected with screws 102 and nuts 104, allowing the hinge pipe 90 to be received in holes 106 and 108 in the hopper support frame 13. The discharge auger hinge 22 and the tubing sleeve 100 are connected as an integral weldment assembly via a support bar 101. The resulting triangulated assembly, including the discharge auger hinge 22, tubing sleeve 100 and support bar 101, maintains alignment and distributes stresses as the discharge auger housing 18 is raised and lowered. An auger pivot shaft 110 is used for connection to the discharge auger housing supports 24 with screws 112 and nuts 114. Vinyl grips 118 are provided at the ends of brackets 116. In operation, the brackets 116 swing outward and away to actuate gates at the bottom of the hopper assembly 12.

Figure 9:
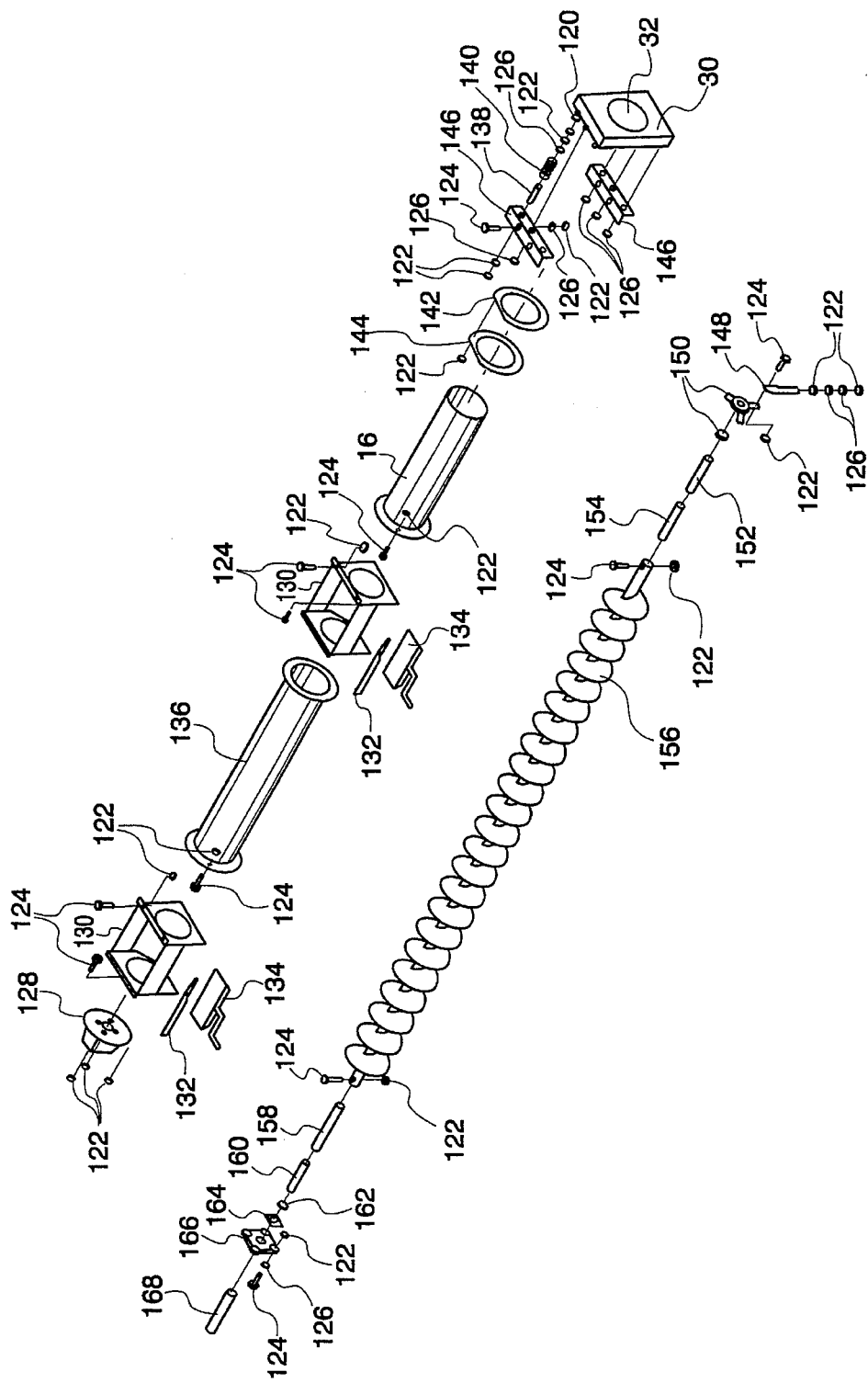
FIG. 9 is a perspective view of the cross auger and rear auger tube illustrating parts associated therewith.

In FIG. 9, a cross-auger assembly and parts associated therewith are shown in detail. The cross-auger assembly is physically located beneath and along the hopper assembly 12 and is supported off the bottom of the hopper support frame 13. In operation, the bulk material stored within the hopper assembly 12 drops through openings into the cross-auger assembly of FIG. 9 and is conveyed outward via rear auger tube 16 through the discharge sealing plate 30 and rear discharge hole 32. The discharge sealing plate 30 mates with the face of the discharge box 20 at the oblong inlet hole 34, both plates being rigid stainless steel vertical plates, providing a substantially dust-tight connection when the discharge auger housing 18 and discharge box 20 are in the discharge position. Discharge sealing plate 30 is spring loaded, with the springs being partially collapsed. Thus, the two flat mating surfaces are assured of being in parallel contact with each other to provide the dust-tight seal required while abutting one another allowing for sliding movement relative to one another. The rear auger tube 16 extending through the rear discharge hole 32 discharges material directly into the discharge box 20.

Threaded studs 120 on the back of the discharge seal plate 30 have nuts 122 and washers 126 thereon. Six pipe spacers 138 and six springs 140 are mounted via the six threaded studs 120 on the back of the discharge sealing plate 30. The pipe spacers 138 and springs 140 cooperate with sealing plate mounts 146 to provide partial spring loading of the discharge sealing plate 30.

A hydraulic motor support 128 is provided for the cross-auger assembly. Twin hopper cross-auger boxes 130 are positioned below the hopper assembly 12 for receiving the bulk material. Side clean-out gates 132 and bottom clean-out gates 134 are associated with the twin hopper cross-auger boxes 130. The twin hopper cross-auger boxes 130 are attached to the hopper support frame 13 and are connected together via a center auger tube 136. At the rear end of the cross-auger assembly are a rubber auger ring 142 and a stainless steel auger ring 144 which slide onto the rear discharge tube 16, positioning the rear auger tube 16 through the spring loaded discharge sealing plate 30. Nuts 122, screws 124 and washers 126 are used throughout the cross-auger assembly of FIG. 9 and discharge auger assembly of FIG. 10 for interconnecting the various parts thereof.

A bearing adjuster 148, auger housing with wood bushing 150, auger drive shaft 152 and auger screw bushing 154 are used to mount the end of a cross-auger screw assembly 156. Alternatively, a conveyor belt or any other means for moving bulk material, as appropriate, will suffice in lieu of an auger screw. At the motorized end, an auger drive shaft 158, auger screw bushing 160, machine bushing 162, RYERTEX spacer (rubber-like spacer) 164, four-hole flange bearing 166 and a coupling sleeve 168 allow for the mounting and connection of the cross-auger screw assembly 156 to the cross-auger motor 66 mounted on the hydraulic motor support 128.

Figure 10:
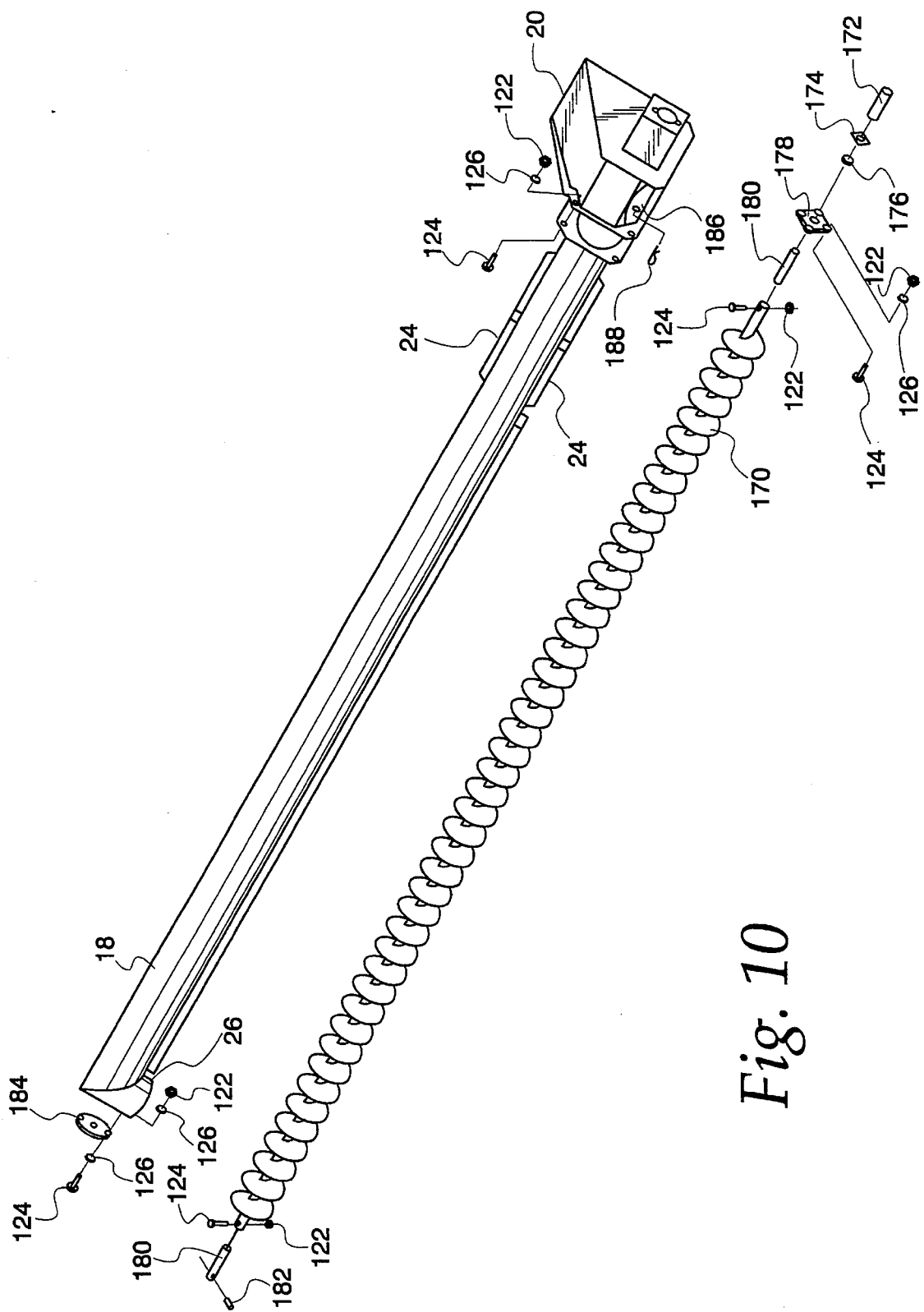
FIG. 10 is a perspective view of the discharge auger housing and parts associated therewith.

FIG. 10 shows in further detail the components used on and within the discharge auger housing 18. A discharge auger screw assembly 170 is used for conveying material through the discharge auger housing 18. Again, a conveyor belt or any other means for moving bulk material, as appropriate, will suffice in lieu of an auger screw. The discharge auger screw assembly is mounted within the discharge auger housing 18 with a coupling sleeve 172, RYERTEX spacer 174, machine bushing 176, four-hole flange bearing 178 and auger drive shafts 180. The discharge auger screw assembly 170 is rotated with the hydraulic discharge auger motor 36 which is mounted on the end of the discharge box 20. At the upper end, near the discharge chute 26, the discharge auger screw assembly is supported via the auger drive shaft 180, a roll pin 182 and a two-hole flange bearing 184.

The discharge box 20 is also provided with a clean-out gate 186 secured with a hair pin 188. The clean-out gate 186 allows the operator to remove material which may be clogged or stuck within the discharge box 20 or discharge auger housing 18. To this end, additional safety shields may be desirable at the discharge box 20, to protect the operator.

While a preferred embodiment of the invention has been shown and described for the one-piece folding auger, other embodiments of the present invention will be readily apparent to those skilled in the art from consideration of the specification and practice of the invention disclosed herein. It is intended that the specification and examples be considered as exemplary only, with a true scope and spirit of the invention being indicated by the following claims.

What is claimed is:

1. A portable self-unloading particulate matter tender suitable for mounting on a vehicle for ground travel, said tender comprising:

a longitudinal extending frame having a first and second end;

a container supported by the frame, the container comprising first and second end walls, first and second side walls defining a chamber having a generally rectangular configuration formed by the side walls connecting the end walls, the side walls including converging and sloping lower portions to provide the chamber with a lower particulate matter collecting portion, the collecting portion having at least one discharge opening and a first means for moving the particulate matter from the at least one discharge opening to one of the first and second ends of the frame; and a pivotable discharge system for selectively communicating with the first means for moving to discharge the particulate matter to a predetermined deposit location being located lateral to the container, the discharge system comprising:

an elongated member having a continuous outer wall, an intake end selectively communicable with said first means for moving to receive the particulate matter and being pivotally mounted adjacent one of the first and second ends of the frame for multi-axis pivoting of the member and a discharge end located opposite the intake end for discharging the particulate matter from the member, a first pivotal mount for pivotally mounting the intake end to enable the member to pivot about a first axis, a second pivotal mount for pivotally mounting the intake end to enable the member to pivot about a second axis, the second pivotal mount being pivotable by and about the first pivotal mount, said first and second pivotal mounts cooperating to pivot the member between a stowed position in which the member extends substantially parallel and adjacent to one of the first and second side walls to a discharging position in which the member extends to locate the discharge end upward and lateral with respect to the container and to connect the intake end to the first means for moving, a second means for mechanically moving the particulate matter through the member from the intake end to the discharge end and means for selectively pivoting the elongated member through the first and second pivotal mounts between the stowed position and the discharge position.

2. A tender in accordance with claim 1 wherein the second means for mechanically moving the particulate matter comprises an auger mounted for rotation in the elongated member and extending longitudinally from the intake end to the discharge end, the auger including a coaxial auger shaft.

3. A tender in accordance with claim 1 wherein the second means for mechanically moving the particulate matter comprises a conveyor system mounted in the elongated member and extending longitudinally from the intake end to the discharge end.

4. A tender in accordance with claim 1 wherein the means for selectively pivoting the elongated member comprises at least two hydraulic systems, a first hydraulic system to pivot the member about the first axis and the second hydraulic system to pivot the member about the second axis.

5. A tender in accordance with claim 1 wherein the means for selectively pivoting comprises manual mechanical means to move the tender about the first and second axis.

6. A tender in accordance with claim 1 further comprising means for dust-free sealing as the particulate matter is communicated from said first means for moving and said second means for moving.

7. A tender in accordance with claim 6 wherein said sealing means is provided by a spring loaded sealing plate.

8. An apparatus for substantially dust-free communication of particulate matter comprising:

a first elongated member having a continuous outer wall defining a first path therethrough;

a second elongated member having a continuous outer wall defining a second path therethrough;

a first sealing plate rigidly mounted at one end of said first elongated member, said first sealing plate having an opening therein coincident with said first path;

a second sealing plate adjustably mounted at one end of said second elongated member and comprising adjusting means for adjustable movement relative to said one end of said second elongated member, said second sealing plate having an opening therein coincident with said second path;

means for selectively positioning said first sealing plate and said second sealing plate into an abutting relation, the adjustably mounted second sealing plate at said second elongated member facilitating coordinated abutment between said first sealing plate and said second sealing plate, thereby aligning said first path with said second path; and means for conveying particulate matter along said first path and said second path.

9. An apparatus in accordance with claim 8 wherein said first path and said second path are generally tubular.

10. An apparatus in accordance with claim 8 wherein said conveying means further comprises:

first conveying means for conveying particulate matter through said first path of said first elongated member; and second means for conveying particulate matter through said second path of said second elongated member.

11. An apparatus in accordance with claim 8 wherein said conveying means comprises an auger screw.

12. An apparatus in accordance with claim 8 wherein said conveying means comprises a conveyor system mounted in said first and second elongated members extending along said first path and said second path to move the particulate matter therebetween.

13. An apparatus for substantially dust-free communication of particulate matter comprising:

a first elongated member having a continuous outer wall defining a first path therethrough;

a second elongated member having a continuous outer wall defining a second path therethrough;

a first sealing plate rigidly mounted at one end of said first elongated member, said first sealing plate having an opening therein coincident with said first path;

a second sealing plate adjustably mounted at one end of said second elongated member, said second sealing plate having an opening therein coincident with said second path;

means for selectively positioning said first sealing plate and said second sealing plate into an abutting relation, thereby aligning said first path with said second path; and means for conveying particulate matter along said first path and said second path; and said second sealing plate being adjustably mounted at said end of said second elongated member by springs, whereby said springs partially collapse on said second plate to assure parallel contact between said first and second sealing plates while being held in abutting relation by said positioning means.

14. An apparatus for vertically adjustable lateral dispensing of material comprising:

a first elongated member having a continuous outer wall defining a first generally tubular path therethrough;

a second elongated member having a continuous outer wall defining a second generally tubular path therethrough;

a discharge box having first and second openings therein, said first and second openings being perpendicular to one another and said first opening being connected to an end of said first elongated member;

a spring loaded sealing plate adjustably mounted at an end of said second elongated member, said sealing plate having an opening therein coincident with said generally tubular path of said second elongated member;

means for selectively positioning said sealing plate and said discharge box into an abutting relation, thereby aligning said opening in said sealing plate with said second opening in said discharge box; and means for communicating the material through said first elongated member, said discharge box and said second elongated member.

15. An apparatus for vertically adjustable lateral dispensing of material comprising:

a first elongated member having a continuous outer wall defining a first generally tubular path therethrough;

a second elongated member having a continuous outer wall defining a second generally tubular path therethrough;

a discharge box having first and second openings therein, said first and second openings being perpendicular to one another and said first opening being connected to an end of said first elongated member;

a sealing plate mounted at an end of said second elongated member, said sealing plate having an opening therein coincident with said generally tubular path of said second elongated member;

means for selectively positioning said sealing plate and said discharge box into an abutting relation, thereby aligning said opening in said sealing plate with said second opening in said discharge box; and means for communicating the material through said first elongated member, said discharge box and said second elongated member; and said selectively positioning means comprising a hinge having a first end pivotally mounted on a frame and a second end pivotally mounted to said first elongated member, whereby said second end of said hinge sweeps through an arc defined as said hinge pivots at said first end and said first elongated member pivots relative to said arc allowing multi-axis movement of said first elongated member.

16. An apparatus in accordance with claim 14 wherein said second opening in said discharge box is generally oblong.

17. An apparatus in accordance with claim 15 wherein said sealing plate is spring loaded.

18. An apparatus in accordance with claim 15, wherein said second opening in said discharge box is generally oblong thereby maintaining communication of material between said second elongated member and said discharge box as said hinge pivots at said first end to vertically adjust said first elongated member.

19. An apparatus in accordance with claim 18 further comprising:

means for moving said hinge; and means for moving said first elongated member about said second end of said hinge.

20. An apparatus in accordance with claim 19 wherein said hinge moving means and said elongated member moving means are hydraulically operable.

* * * * *